Feb. 4, 1936.  L. ELGAARD  2,029,864
HOT GAS VALVE
Filed Dec. 16, 1931  2 Sheets-Sheet 1
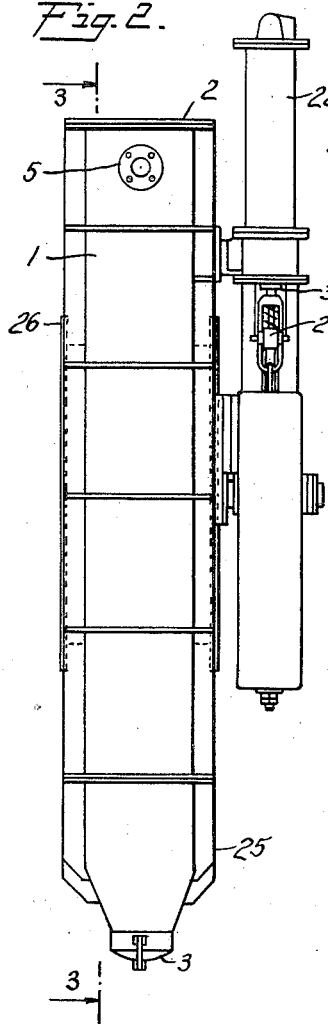
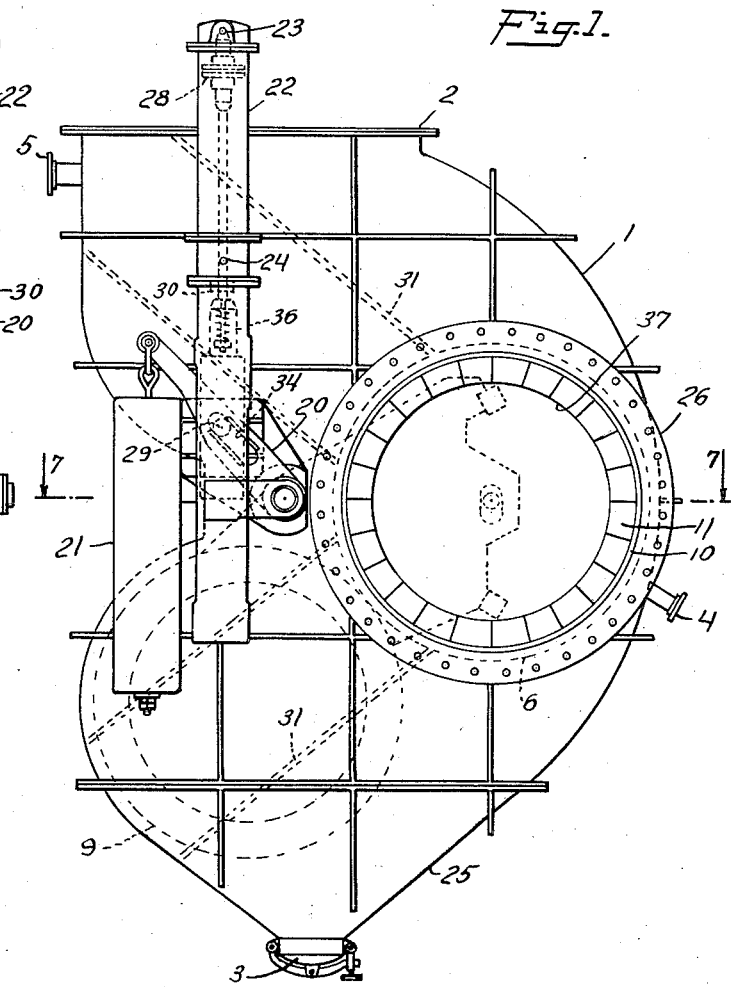
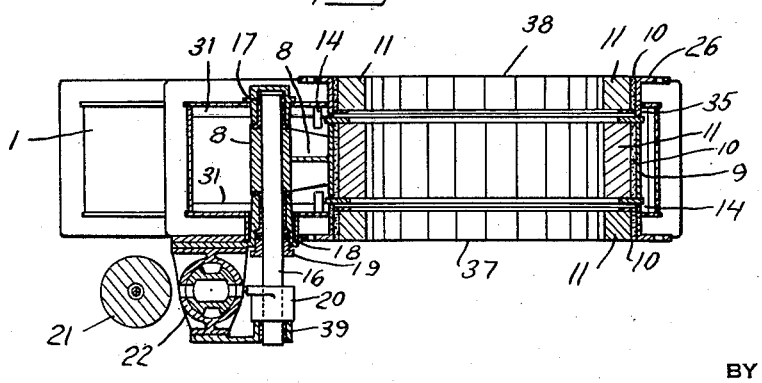
INVENTOR
Lauritz Elgaard
BY
ATTORNEY Feb. 4, 1936. L. ELGAARD 2,029,864
HOT GAS VALVE
Filed Dec. 16, 1931 2 Sheets-Sheet 2
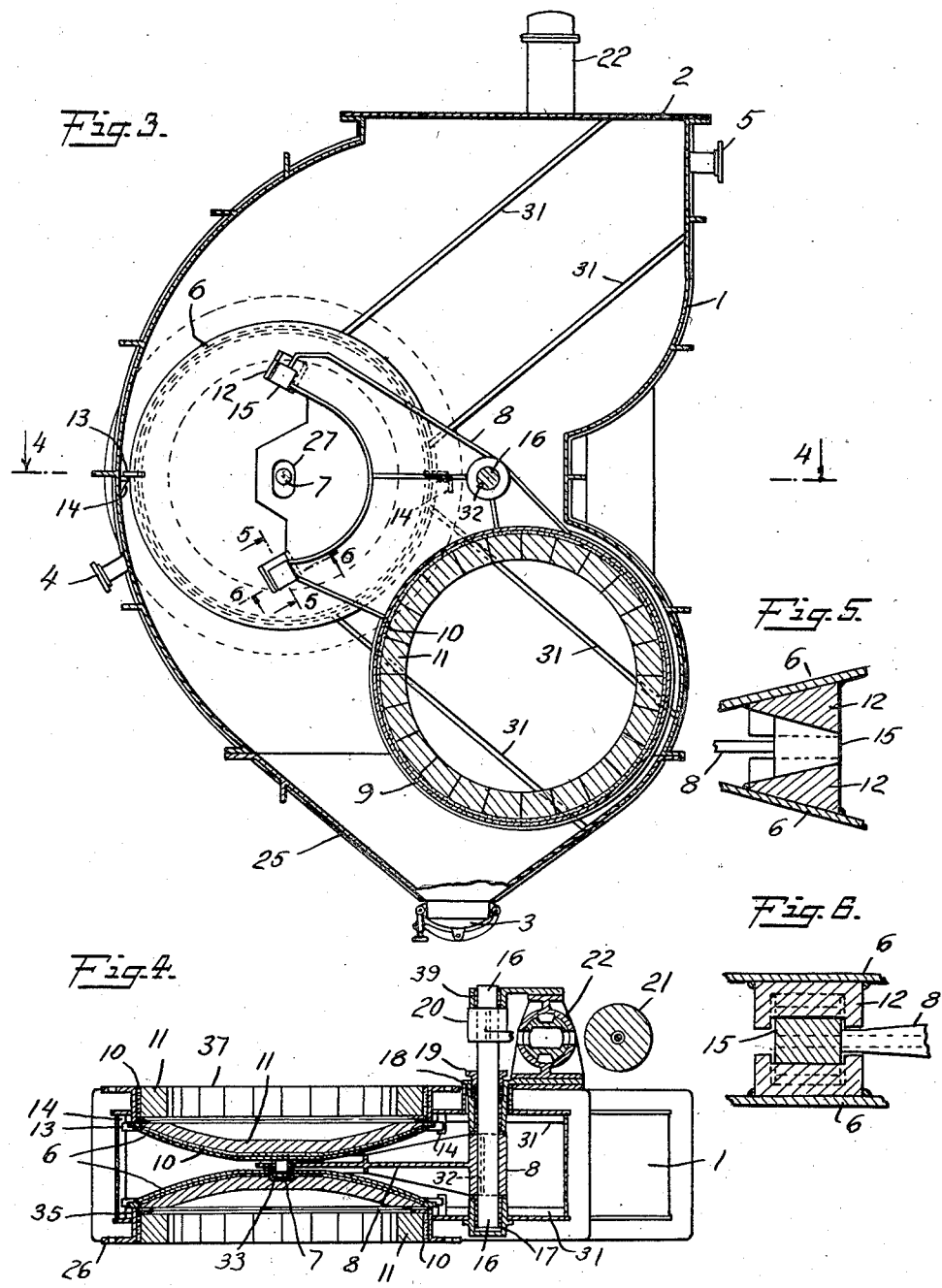
INVENTOR
Lauritz Elgaard
BY
ATTORNEY Patented Feb. 4, 1936

2,029,864

UNITED STATES PATENT OFFICE 2,029,864

HOT GAS VALVE

Lauritz Elgaard, Kew Gardens, N. Y., assignor to Semet-Solvay Engineering Corporation, New York, N. Y., a corporation of New York Application December 16, 1931, Serial No. 581,380

4 Claims. (Cl. 251—18)

This invention relates to valves and particularly to valves for use with hot gas lines where the temperature of the gases is sufficiently high to cause injury to exposed metal parts. In a water gas plant, for example, the hot gases conveyed are particularly injurious to the valves commonly employed, necessitating frequent repairs and replacements.

It is an object of my invention therefore to produce a valve which is particularly adapted for service in such gas lines and which is not subject to the aforementioned disadvantages.

Another object of my invention is to construct a valve which is especially resistant to the action of hot gases and which has substantially no exposed metal parts to be injured by gases passing therethrough.

A further object is the construction of a valve which is readily accessible for repairs and which consequently will reduce to a minimum the period in which it is out of service.

A still further object of my invention is to produce a valve which is of very simple construction, which is compact, takes up very little space, and is easily and quickly operated, and which requires a minimum of power for its operation.

Further objects may become apparent from a consideration of the following description in connection with the accompanying drawings.

The valves commonly employed for service in hot gas lines are of a variety of constructions but consist in general of a sliding or pivoted gate of steel or iron within a valve housing, the gate being adapted to move into a position between inlet and outlet ports. The gate may be manually controlled or controlled automatically by means of hydraulic or gas operated plungers.

It has been proposed to construct the valve disc or gate referred to of very thin metal in order to give it maximum heat conductivity and to then pass a relatively cool gas through the housing while the valve is in closed position to prevent the disc from acquiring too high a temperature and eventually "burning out". This valve has the disadvantage that due to the very thinness of the disc only a small degree of erosion or corrosion will cause breaks and necessitate repairs.

In previous valves which employ in addition to the valve closure an insulated rim to protect the inside of the valve housing from the direct action of hot gases, a sliding gate has been used. This type of gate necessitates an excessively long housing which is cumbersome and which requires a great deal of space for its operation.

My new valve is so constructed that the valve housing is very much smaller than in known types, and the amount of space necessary is greatly reduced.

In my improved valve, I have overcome other disadvantages of prior valves by a construction which admits of insulating the metal gate from the hot gases at all times, yet still permits the cooling of the metal portions of the gate in the period of operation during which the valve is closed.

Furthermore, I have provided a valve, the interior of which is readily accessible, and from which all moving parts may be quickly removed and reinserted. By having incorporated therein a counterweighted valve gate, my valve is capable of efficient operation with a very small expenditure of power. Also, by means of a special wedge construction the valve discs are seated firmly and valve leakage is prevented. A liner ring which is automatically inserted between valve ports, when the valve is in an open position, protects the inside of the valve housing and the valve gate from the hot gases passing through the valve.

Referring to the drawings which disclose a specific embodiment of my invention:

Fig. 1 is a side elevation of the valve in a closed position showing especially the actuating and counterweighting mechanisms;

Fig. 2 is an end elevation showing the relation of the actuating mechanism to the valve housing and illustrating the compactness of my improved valve;

Fig. 3 is a vertical section on line 3—3 of Fig. 2 with the valve in a closed position showing in particular the mounting of valve discs and gate;

Fig. 4 is a cross-section on line 4—4 of Fig. 3 showing the arrangement of valve discs and their relation to the valve gate and valve ports when the valve is in a closed position;

Fig. 5 is an enlarged section on line 5—5 of Fig. 3 showing a detail of my improved automatic wedge valve seating mechanism with the valve in closed position; and Fig. 6 is an enlarged section on line 6—6 of Fig. 3 showing another view of the wedge mechanism.

In Figs. 5 and 6 two wedge blocks 12 are shown in order to more clearly illustrate the operation of the interposed wedges 15 although, as will be noted, Fig. 3 is a section between the valve discs and consequently only one of the discs and only one wedge block is shown contiguous to each of the wedges.

Fig. 7 is a sectional view on line 7—7 of Fig. 1 with the valve in an open position and showing my improved liner ring construction in registry with the valve ports and protecting the interior of the valve housing from the direct blast of the hot gases passing therethrough.

With particular reference to the figures of the drawings, the numeral 1 represents a valve housing which may be composed of heavily ribbed welded steel or of cast iron or steel or of any other suitable construction material. Guides 31 are provided on the interior lateral faces of housing 1. These guides constitute tracks for the valve discs to slide over assuring smooth operation of the valve gate. Housing 1 is further provided with a cover plate 2 and with a removable section 25 for providing ready access to the interior of the housing for repairing or assembling. The housing 1 is also provided with pipe connections 4 and 5 for the passage of a cooling medium, such as air or steam, therethrough in the event that such cooling medium is necessary or desirable. A quick-opening door 3 is located at the base of the removable section 25, for the removal of any dirt, sludge or any other matter which may be deposited in the valve housing. The valve housing 1 has, on opposite sides thereof, inlet and exhaust ports 37 and 38 provided with abutting flanges 26 for connecting the valve into the gas line. It is obvious, however, that any other convenient coupling means may be employed for this purpose, if desired. Ports 37 and 38 are provided with annular linings of insulating material 10 and fire brick 11 to protect the metal surfaces from the direct action of the hot gases. The interior surfaces of the housing 1, adjacent to the ports, are provided with faces or valve seats 35, most clearly shown in Fig. 4, against which valve discs are adapted to rest when the valve is closed. Bearings 17 and 18 are mounted on opposite sides of the housing 1 for supporting a rotatable shaft 16. The bearing 18 is provided with packing gland 19 for preventing the escape of gases from the interior of the housing. Keyed to shaft 16 by a key 32, best shown in Figs. 3 and 4, or otherwise rigidly affixed to the shaft is a frame or gate 8 which may be of steel or other suitable construction material, said gate having near one end thereof a slot 27. Supported on the other end of frame 8 is an annular ring 9 lined with insulating material 10 and fire brick 11 in the same manner as the ports 37 and 38. The inside dimensions of the annular ring 9 correspond to those of the inlet and outlet ports 37 and 38, and it is constructed of substantially the same width as the interior of the valve housing so that, when placed co-axially with respect to the ports, the edges of the annular ring register with the corresponding ports and it constitutes a substantially continuous conduit through the housing.

Valve discs 6 are mounted on frame 8. These discs may be composed of steel or other suitable material and are preferably lined, e. g. with plastic brick or other insulating material or with insulating material 10 and fire brick 11 on the surfaces which face the valve ports. These surfaces are preferably concave so that the insulating lining and fire brick may be more firmly affixed thereto, although, as is obvious, this is not essential and any construction which will permit firmly attaching such material may be employed. One of the valve discs 6 is provided with a pin 7, rigidly affixed thereto, and protruding from that surface of the disc which faces the interior of the housing, that is, the surface abutting the supporting frame 8. The other disc is provided with a conjoint recess 33. The pin 7 has its bearing in slot 27 and engages with its free end the recess 33. Proper engagement of the two discs is maintained by means of the guides 31, which limit the separation of these discs. It is obvious, however, that other means may be employed for mounting the discs without exceeding the scope of my invention, also for the loosely engaged pin construction shown, other conventional methods of preventing the separation of the discs, such as for example connecting links or springs, may be used, and I have merely illustrated one method which I consider especially desirable.

Means are provided to rotate shaft 16 and thus move the gate 8 between two extreme positions, one position wherein the valve discs 6 are aligned with the inlet and outlet ports, and the other position in which the annular ring is aligned therewith. Referring to Fig. 1, this rotating means in its preferred form consists of an arm 20 rigidly affixed to shaft 16 and having a longitudinal slot or groove 34 therein. This arm in conjunction with an additional bearing 39, acts as a guide or thrust bearing and prevents the longitudinal movement of shaft 16 out of the bearing 17. Mounted upon the housing 1 by any suitable means, for example, by a welded union or by stud bolts, is a hydraulic cylinder 22 of conventional design having ports 23 and 24 and packing gland 30. Within this cylinder is a plunger 28 supporting a pin 29 adapted to engage the slot 34. A shock absorber is provided on the plunger 28 to lessen the shock in opening and closing the valve. Fluid pressure applied against the plunger from ports 23 and 24, operates to open and close the valve. A counterweight 21 is provided at the end of arm 20 so designed that it just equalizes the weight of frame 8. The weight of the parts of gate 8 is preferably so distributed that the counterweight 21 balances the frame at all positions of the valve gate.

Mounted on the discs 6 on the sides which face the interior of the housing, i. e. on the sides which face the frame 8, are wedge blocks 12. As shown in Fig. 1 of the drawings, there are two of these blocks on opposite sides of the center, although, as will be readily understood, as many of such blocks may be provided as is desirable to secure an even seating of the valve discs against the valve seat. Mounted on frame 8 are wedges 15 adapted to coact with the wedge blocks 12 to seat the valve discs 6. These wedges 15 are so positioned on frame 8 that when the discs 6 are supported by bearing pin 7 on the lower end of slot 27, the wedges and wedge blocks will be out of engagement, but when slot 27 moves downwardly with respect to the pin 7 and discs 6, the wedges 15 will move into the position shown in Figs. 5 and 6, engaging the wedge blocks 12 and forcing the two discs 6 apart. The valve housing 1 is provided with lugs or stops 14 adjacent to the ports 37 and 38, and the discs 6 are provided with coacting lugs 13 so positioned as to stop the downward movement of discs 6 when they are in a position coaxial with the valve ports and in registry with the valve seats. Hence, in closing the valve when the discs reach this position, their further downward motion is prevented, but frame 8 continues to rotate, the slot 27 sliding downwardly with respect to pin 7. As the frame moves downward, wedges 15 engage wedge blocks 12, forcing the discs against the valve seats 35.

The operation of the valve is exceedingly simple. With the valve in the closed position shown in Fig. 1, to open the valve, fluid pressure is applied at port 23 of cylinder 22. The pressure forces plunger 28 downward in cylinder 22, carrying with it pin 29 which engages arm 20 and forces this arm to rotate shaft 16 in a counterclockwise direction, in the view shown in Fig. 1. Shaft 16 carries with it the large frame 8, causing wedges 15 to release the wedge blocks 12 and permit the valve discs 6 to fall away from the valve seats 35. As the frame 8 continues to revolve, it carries slot 27 upwardly until the base or bearing portion of this slot engages the pin 7 and lifts the valve discs 6. As the valve discs 6 pass upwardly away from the valve ports, the annular ring 9 simultaneously moves upwardly and into a position in registry with the valve ports as shown in Fig. 7.

To close the valve, fluid pressure is applied at port 24, raising plunger 28 and pin 29, which engages arm 20 and forces this arm to rotate shaft 16 in a clockwise direction, considered from the view shown in Fig. 1, revolving frame 8 about shaft 16 and carrying the annular ring 9 downward away from the ports. Valve discs 6 sliding along guides 31, continue to move downwardly until they are in registry with the valve ports 37 and 38. Due to the guides 31, it is not necessary that the valve be mounted accurately in a vertical plane, but it may be canted to a considerable degree and still function smoothly, the valve discs being guided accurately into their proper positon between the valve seats. When the valve discs reach this position, the lugs 13 engage stops 14 and prevent the further downward movement of the discs. Frame 8 continues to travel, moving wedges 15 into engagement with the wedge blocks 12 and forcing discs 6 against the valve seats 35. With the valve in this position air, steam or other cooling medium may be passed into the housing at pipe 4 and out at pipe 5, thus keeping the metal parts of the valve at a low temperature. Since the portion of the valve discs exposed to the hot gases is thoroughly insulated, the metal itself is not heated to a great extent by the gases and may be effectively cooled in this manner, contrasting with the types of valve discs which have one side of the metal directly exposed to the hot gases, and the metal of which, therefore, cannot be adequately cooled.

If repairs become necessary, ready access to the interior of the valve is provided by cover plate 2 and removable section 25. In order to remove the entire gate assembly, it is necessary only to remove cover plate 2 and shaft 16, and hoist the gate assembly out of the housing where replacements or repairs can be quickly and easily made.

I claim:

1. A valve comprising a housing, an inlet port and an outlet port on opposite sides of said housing, valve seats circumscribing said ports on the interior of said housing, a frame within said housing adapted to rotate between two extreme positions, an eccentrically disposed slot in said frame, a valve disc having a pin projecting from one face thereof, a second valve disc having a recess in one face thereof, said pin projecting through said slot and adapted to slide therein in a direction transaxial with respect to the pin and transradial with respect to the axis of rotation of the frame, said recess loosely engaging the projecting end of said pin, means for maintaining the engagement of said pin with said recess, said discs being adapted to register with said ports when the frame is near one extreme position, lugs on said discs, stops at said ports engaging said lugs when the discs are in registry with said ports and preventing their further movement, wedges on said frame adapted to engage wedge blocks on said discs to force said discs against said valve seats, said wedge blocks being engaged by said wedges by the relative movement of said frame with respect to said discs by rotation of said frame to said one extreme positon.

2. A valve comprising a housing, an inlet port in one side of said housing, an outlet port in the opposite side of said housing, valve seats circumscribing said ports on the interior surfaces of said housing, said valve seats being in spaced, substantially parallel planes, a shaft rotatably mounted in said housing, said shaft being perpendicular to the planes of said valve seats, means for rotating said shaft, a frame rigidly mounted on said shaft and adapted to oscillate therewith between two extreme positions, two discs supported on opposite sides of said frame and adapted to register with the inlet and outlet ports respectively when the frame is in one extreme position, an annular ring carried by said frame and, when the frame is in the other extreme position, adapted to rest between said ports and to constitute a conduit through said housing, the two edges of said annular ring being in registry with the respective ports, lugs on said discs, coacting lugs adjacent to said ports and adapted to prevent the movement of said discs beyond positions in registry with said ports, wedges on said frame, and additional lugs on said discs, said wedges coacting with said additional lugs and adapted to force said discs away from said frame and against said valve seats.

3. A valve comprising a housing, an inlet port in one side of said housing, an outlet port in the opposite side of said housing, valve seats circumscribing said ports on the interior surfaces of said housing, said valve seats being in spaced, substantially parallel planes, a frame within said housing adapted to rotate between two extreme positions, means for moving said frame, an eccentrically disposed annular ring on said frame, adapted when the frame is in one extreme position, to rest between said ports and to constitute a conduit through said housing from said inlet port to said outlet port, two discs slidably mounted on opposite sides of said frame and, disposed eccentrically thereof, and adapted to register with said ports when the frame is near the other extreme position, lugs on said discs, stops at said ports engaging said lugs when the discs are in registry with said ports, said lugs and said stops coacting to prevent the movement of said discs beyond this point, wedges on said frame, and wedge blocks on said discs adapted, when engaged by the wedges, to force said discs against said valve seats, said wedge blocks being engaged by said wedges by the movement of said frame relative to said discs in its rotation to said other extreme position.

4. A valve comprising a housing, an inlet port in one side of said housing, an outlet port in the opposite side of said housing, valve seats circumscribing said ports on the interior surface of said housing, said valve seats being in spaced, substantially parallel planes, a shaft rotatably mounted in said housing, said shaft being perpendicular to the planes of said valve seats, means for rotating said shaft, a frame rigidly mounted on said shaft and adapted to oscillate therewith between two extreme positions, an annular ring carried by said frame and, when the frame is in one extreme position, adapted to rest between said ports and to constitute a conduit through said housing, the two edges of said annular ring being in registry with the respective ports, two discs slidably mounted on opposite sides of said frame and adapted to register with said ports when the frame is near the other extreme position, lugs on said discs, stops adjacent to said ports and engaging said lugs when the discs are in registry with said ports, said lugs preventing the movement of said discs beyond this point, wedge blocks on said discs adapted when engaged by wedges on said frame to force said discs against said valve seats, said wedge blocks being engaged by said wedges by the movement of said frame to said other extreme position, said ports and annular ring being lined and the surface of said discs facing said ports being covered with heat resistant material, means for circulating a cooling medium within said housing.

LAURITZ ELGAARD.